Jan. 12, 1937.  C. H. DOOLEY  2,067,439
FILTER
Filed May 29, 1933  3 Sheets-Sheet 1

Inventor:
Clarence H. Dooley
By: [signature]
Attys.

Jan. 12, 1937.  C. H. DOOLEY  2,067,439
FILTER
Filed May 29, 1933  3 Sheets-Sheet 2
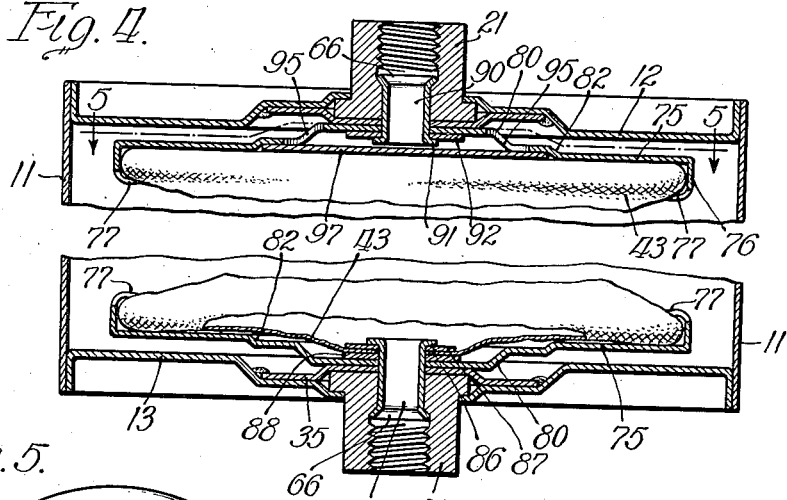
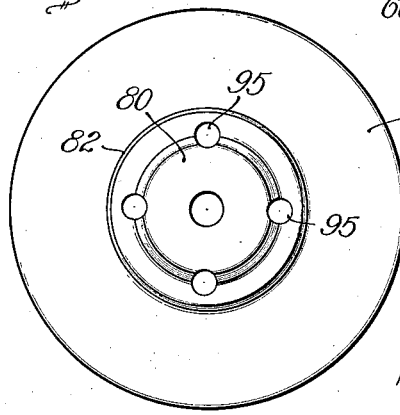
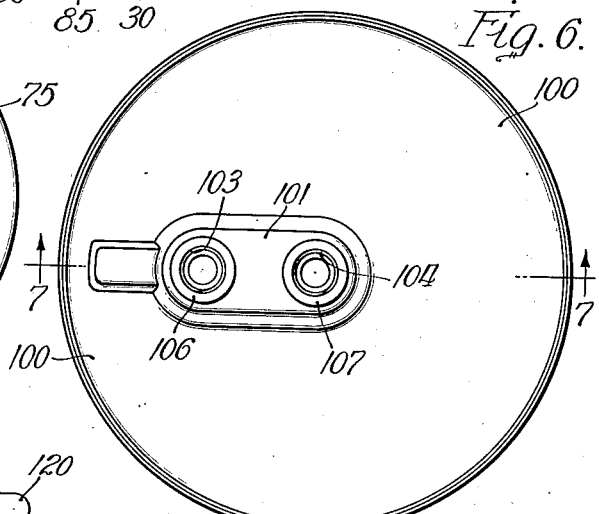
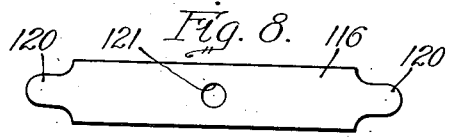
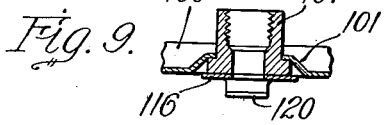
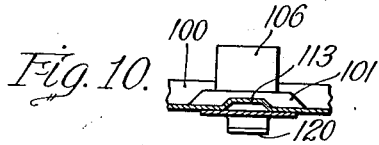
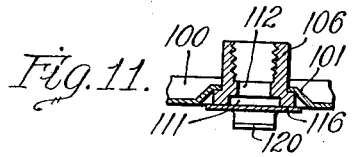
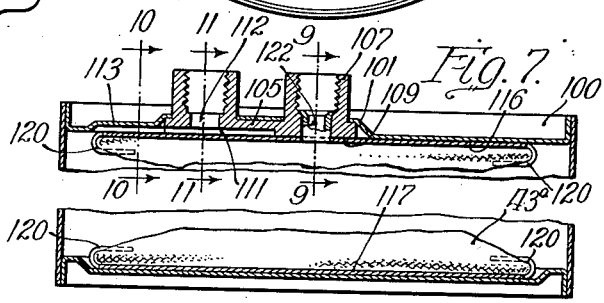
Inventor:
Clarence H. Dooley
By: [signature]
Attys.

Jan. 12, 1937.  C. H. DOOLEY  2,067,439
FILTER
Filed May 29, 1933  3 Sheets-Sheet 3
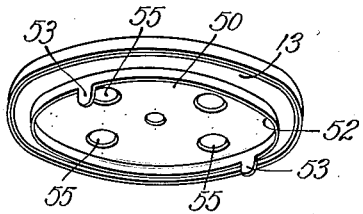
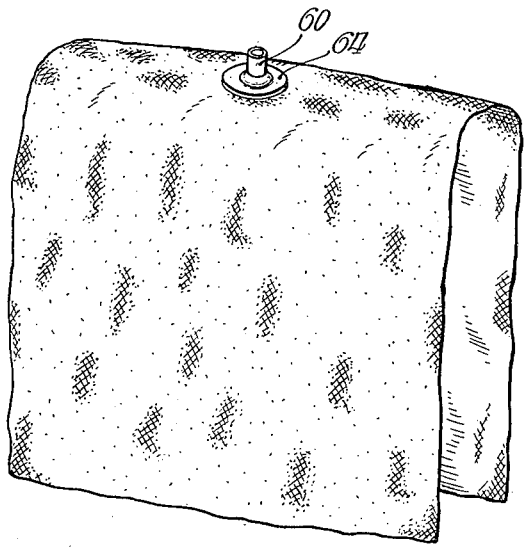
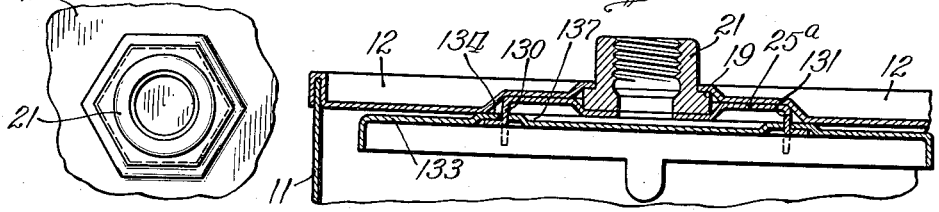
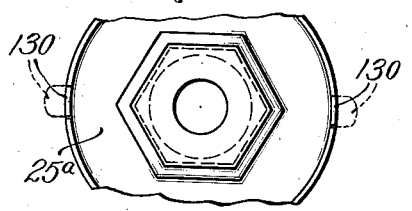
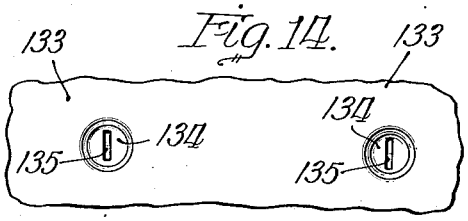
Inventor:
Clarence H. Dooley
By Attys.

Patented Jan. 12, 1937

2,067,439

UNITED STATES PATENT OFFICE 2,067,439

FILTER

Clarence H. Dooley, Rock Island, Ill.

Application May 29, 1933, Serial No. 673,365

21 Claims. (Cl. 210—164)

The present invention relates generally to filtering devices and is particularly concerned with filters and the like adapted to be disposed in the lubrication systems of automobiles and the like for filtering the lubricating oil.

The principal object of the present invention is to provide an inexpensive but sturdy filter construction of the type which may be discarded after its efficiency and usefulness as a filtering agent has been destroyed by the presence of the deleterious matters removed from the lubricating oil.

Another object of the present invention is the provision of a filter which may be easily and quickly assembled and in which, after assembly, the filtering element or unit is securely held in position within the enclosing casing. Still further, another object of the present invention is the provision of a filter element or unit embodying metallic end members or plates which are so constructed and arranged that they may be welded, soldered or otherwise permanently attached to the ends of the filter casing. It is also an object of the present invention to arrange such end plates or members of the filter unit so that they may be firmly clamped or otherwise permanently attached to the ends of the filter element.

An additional object of the present invention is the provision of a filter element embodying a filter bag and a supporting spring helix adapted to be disposed within a casing which is closed by end members, to which members there are secured end plates before assembly of the filtering device and which end plates have means for clamping to the end coils of the helix outside the filter bag itself. By virtue of this construction, the end casing members being secured in place after the end plates or heads have been attached to the end coils of the helix, the filter bag is effectively secured between the ends of the supporting helix and the end plates or heads, the latter at the same time being firmly clamped to the spring helix so that the latter will not be compressed or deformed by virtue of the pressures existing within the lubrication system.

Still further, another object of the present invention is the provision of a filter embodying a casing having end members which are provided, respectively, with inlet and outlet connections, one of said connections being in the form of a tubular member or rivet serving to provide communication between the inside of the filter bag and the exterior of the casing, said tubular rivet or member also serving to secure the filter head to the end member of the casing and outside the filter bag.

These and other objects of the present invention will be apparent to those skilled in the art after a consideration of the following detailed description, taken in conjunction with the accompanying drawings.

In the drawings:

Figure 4 is a cross sectional view, corresponding to the view shown in Figure 1, showing a modified form of construction wherein tubular rivets are employed for connecting the filter heads with the end members of the casing;

Figure 5 is a view of one of the filter heads, corresponding to the view taken along the line 5—5 of Figure 4;

Figure 6 is a top plan view of a second modified form of the present invention, embodying a construction wherein the inlet and outlet openings are formed in the same end of the filter casing;

Figure 7 is a vertical section taken substantially along the line 7—7 of Figure 6;

Figure 8 is a view of one of the filter heads, which is in the form of a strap member, employed in the construction shown in Figure 7, Figure 8 being taken on a reduced scale;

Figure 9 is a fragmentary section taken along the line 9—9 of Figure 7;

Figure 10 is a fragmentary section taken along the line 10—10 of Figure 7;

Figure 11 is a section taken along the line 11—11 of Figure 7;

Figure 12 is a perspective view illustrating the application of the filter bag material to one of the end members for the casing, this view illustrating the utilization of the tubular rivet or member which not only secures the end of the filter bag to one end of the casing but also serves as means for securing one of the casing heads, disposed outside the filter bag, to the end member of the casing;

Figure 13 is a fragmentary sectional view illustrating a third modified form of the present invention wherein the filter head is adapted to be secured to the end member of the casing by means engageable within slots formed in the filter head;

Figure 14 is a fragmentary plan view, looking upwardly in Figure 13, illustrating the slots mentioned above; and Figures 15 and 16 are, respectively, top and bottom views of the end member of the casing shown in Figure 13.

Figure 1:
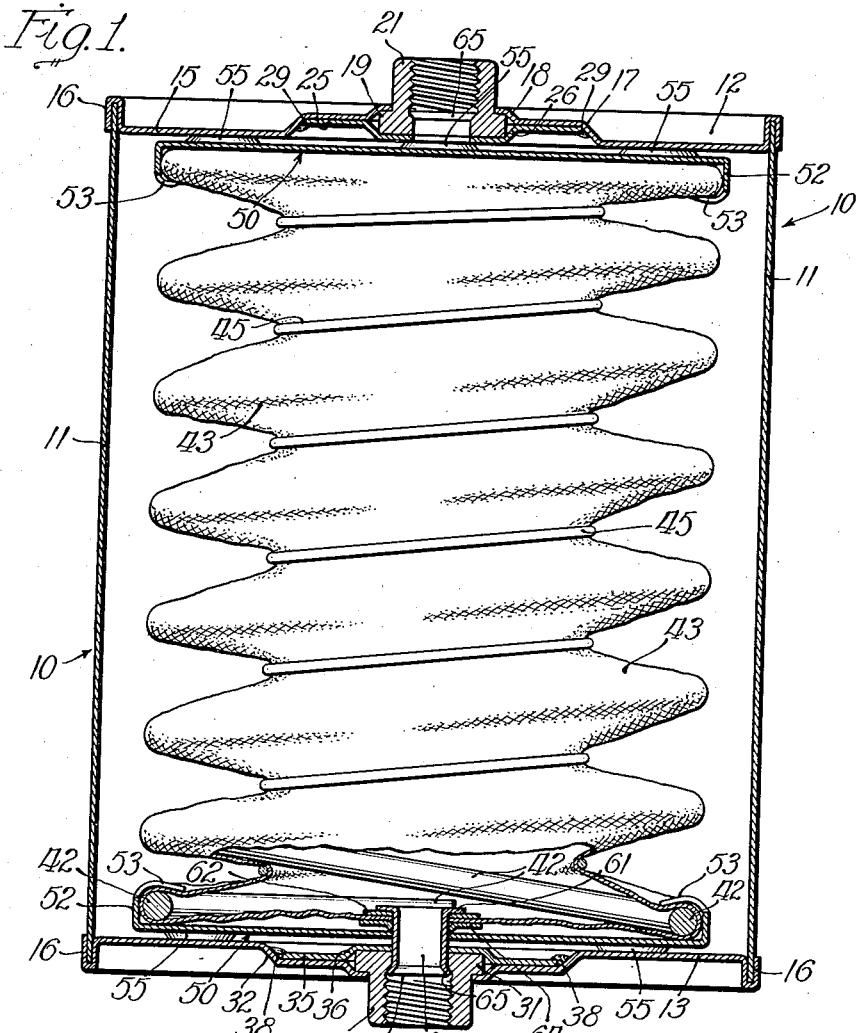
Figure 1 is a vertical sectional view taken through a filter embodying the principles of the present invention.
Figure 2:
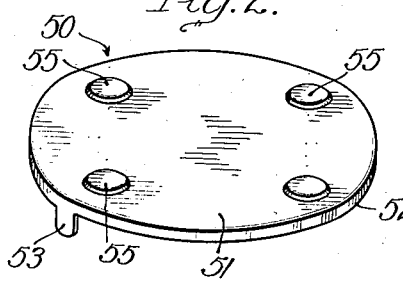
Figures 2 and 3 illustrate two possible forms for the filter heads shown in Figure 1.

Referring now more particularly to Figures 1 and 2, the reference numeral 10 indicates the casing of the filter. The casing 10 consists of a generally cylindrical member or shell 11 having ends closed by end members 12 and 13, preferably of substantially the same construction. Each of the end members 12 and 13 consists of a circular plate 15 having a flange 16 adapted to be turned over the corresponding end of the casing 11 and to be soldered or otherwise firmly secured thereto after the filter parts have been assembled within the casing.

The central portion of the upper end member 12 includes a central recessed section, indicated by the reference numeral 17, and the central portion of this section includes a hexagonal portion 18 adapted to receive the hexagonal head 19 of a nipple 21. The head 19 is maintained within the recessed portion 18 by means of a plate 25 which is formed similarly to the circular plate 15 in that it is provided with a hexagonal portion 26 which receives the head 19 of the nipple 21. Preferably, the plate 25 is soldered or welded to the recessed portion 17 of the plate 15, as indicated by the reference numeral 29, the recessed portion 17 being of such depth that the hexagonal portion 26 of the plate 25 is substantially flush with the inner surface of the circular plate 15.

The lower casing end member 13 is of substantially the same construction. The nipple is indicated by the reference numeral 30 and includes a hexagonal head portion 31 disposed between a central recessed portion 32 formed in the end member 13 and a plate or disc 35 having a recessed portion 36 arranged to maintain the head 31 in place, the plate 35 being soldered or welded to the end member 13, as indicated at 37.

In the preferred construction, the nipple 21 forms the inlet to the casing 11, while the nipple 30 forms the outlet thereof, but it is to be understood, of course, that these relations may be reversed if desired.

The filter unit preferably consists of a spring member 42 in the form of a helix enclosed within and supporting a filter bag 43 formed of suitable filtering material, such as cotton flannel or the like. The superficial area of the filter bag 43 is increased by the provision of an external helix in the form of a cord or wire 45 wound around the bag 43 between the turns of the spring helix 42. This construction serves to increase the available filtering area without necessitating the provision of a casing of excessive length.

Figure 3:
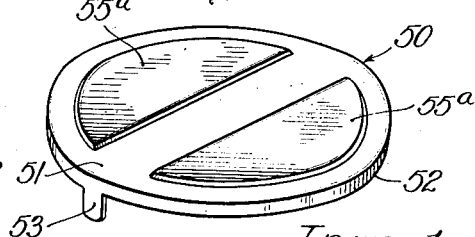

The ends of the filter bag 43 are effectively secured to the end coils of the helix 42 and, at the same time, the ends of the filter unit as a whole, are securely attached to the end members 12 and 13 of the casing 11 by end plates or heads which may be of the construction shown in either Figure 2 or Figure 3. From these figures it will be seen that each of the heads, indicated in its entirety by the reference numeral 50, consists of a circular plate 51 having a marginal flange 52 with clamping lugs or ears 53 and spacing bosses or projections 55 formed integrally therewith. For purposes of illustration I have shown four spacing projections 55 and two clamping ears 53, but it is to be understood that the number and character of these parts may be varied as desired. While the clamping ears or lugs and the spacers 55 are preferably integral with the plate 51 they are not necessarily so, as equivalent means separate from the filter head but attached thereto or any other securing means may be provided if desired.

The diameter of the flanged portion 52 of each of the filter heads or plates 50 is such that the end of the helix fits snugly therein with the corresponding end of the filter bag 43 disposed between the end coil and the head or plate 50, as best shown in Figure 1. The end coils of the helix 42 are preferably held in non-detachable relation within the flanged portion 52 of the heads 50 by the clamping ears or lugs which are bent over to firmly engage the helix 42 and the material of the filter bag 43, as best indicated in Figure 1. The circular plates 51 are maintained in spaced relation from the inner face of the casing end members 12 and 13 by virtue of the spacing bosses or protrusions 55, for a purpose which will appear later.

Communication is established between the interior of the filter bag 43 and the exterior of the casing through the outlet nipple 30 by means of a tubular member, which may be a tubular rivet 60 having a flange 61 and a washer 62 disposed within the filter bag 43. The tubular rivet 60 carries a clinching washer 64 disposed on the outside of the end of the filter bag 43 and serving to secure the material of the bag therebetween. The lower head 50 is provided with a suitable opening accommodating the tubular member 60, the outer end of the latter being adapted to be inserted into the outlet nipple 30 and to then be riveted over a shoulder 65 thereof, as indicated by the reference numeral 66. After the tubular member 60 has been riveted in place within the outlet nipple 30, it will be seen that a leak-tight joint is maintained between the lower cylinder end 13 and the filter bag 43.

When the filter, described above, is inserted into the lubrication system of an automobile or other machine, the lubricant is preferably arranged to enter the casing 11 through the inlet nipple 21. The stream of oil is diverged by virtue of its coming into contact with the upper filter head 50 and is directed radially outwardly with respect thereto, by virtue of the spacing maintained between the upper surface of the head 50 and the inner surface of the end plate 15. The lubricant then flows into the casing or can 11 outside the filter bag 43 and filters into the interior thereof, all sludge, grit, and other deleterious matter remaining outside the filter bag. The filtered oil on the interior of the bag 43 then passes out through the tubular member 60 and the outlet nozzle 30.

Figure 3 illustrates a slightly different form of filter head which employs raised sections 55a on opposite sides of the center line, instead of the knobs or bosses 55 shown in Figures 1 and 2, for spacing the head 50 from the end member of the casing so as to permit the lubricant to flow away from the inlet nozzle 21. It is to be noted that while I have shown in Figure 1 the heads 50 as being identical, the lower head need not be provided with raised protuberances or sections 55 or 55a, since there is no necessity for any oil flow underneath this head.

From the above description it will at once be seen that the filter, constructed according to the principles of the present invention, is simple yet sturdy, and of inexpensive construction so that the entire unit may be discarded when filled with dirt and the like. It is to be noted, further, that the ends of the helix 42, supporting the filter bag 43, are firmly secured to the head plates or members 50, and the latter are, in turn, effectively and permanently secured to the end members 12 and 13 of the casing proper. By virtue of this construction, the filter element is firmly and permanently supported in place and is capable of withstanding any of the pressures developed in the lubrication system.

The construction of the filter above described is such that its assembly during the manufacture thereof is greatly facilitated. In manufacturing and assembly, the first step is to secure the heads 50 to their respective end members 12 and 13, this being accomplished preferably by spot welding or the like, but it is to be understood that other means may be employed if desired. Figure 12 illustrates the end member 13 with its head or plate 15 attached thereto, being spot welded at one or more of the bosses 55. From this figure it will be noted that the ears or lugs 53 extend outwardly with respect to the flange 52 in a position to receive the end coil of the spring helix 42. The upper end member 12 appears substantially the same as the member 13 shown in Figure 12.

The next step is to construct the filter element, comprising the spring helix 42 and the filter bag 43. A suitable piece or sheet of filtering material is provided with an opening, somewhat centrally thereof, to receive the tubular rivet 60 and the washer 62 thereof. The tubular rivet 60 is inserted through the opening, as indicated in Figure 12, and then the clinching washer 64 is applied to fasten the rivet 60 in place. After the end of the rivet 60 is inserted into the openings in the filter head 50 and the casing end member 13 and riveted in place, as indicated at 66 in Figure 1, the side edges of the filter bag are then sewed together by a line of stitching and the spring helix 42 disposed therein. The end of the bag is then completed by a line of stitching so as to completely enclose the spring 42, as somewhat more completely disclosed in my copending application, Serial No. 656,923, filed February 15, 1933.

After the filter bag 43 has been formed with the spring helix 42 on the interior thereof, the outer cord or wire 45 is applied, being drawn to form a helix of a substantially smaller diameter than the diameter of the spring helix 42, thus producing a bag of filtering material having folds or corrugations formed therein to increase the filtering surface in proportion to the length of the filter element. After the filter element has been formed, the ears 53 on the head 50 attached to the casing end member 13 are pinched or clamped over the end coil of the helix 42, the material of the filter bag end being thereby firmly secured between the head 50 and the supporting spring helix 42 on the inside of the bag.

The next step in the assembly is to insert the filter bag 43 into the end of the casing 11 until the end member 13 is engaged over the end of the casing, as indicated in Figure 1. If desired, the end member 13 may be secured to the casing at this time.

The next step is to apply the other casing end member 12, and this is accomplished in the following manner. The end of the filter unit is grasped, either by tools or otherwise, and extended slightly so as to bring the end of the filter unit outside the casing 11. The end member 12 is then applied so as to bring the end of the spring helix 42 within the flanged portion 52 of the head 50 attached to the end member 12, and then the ears 53 are clamped or pinched over the end of the filter bag and the end coil of the spring helix 42. It is to be noted that the opposite end of the spring helix also fits snugly within the flanged portion 52 of the other filter head 50.

After both ends of the filter unit have been permanently secured to the heads 50, the casing end member 12 is fitted over the end of the casing 11 and this end member, or both of the end members in case the other end member has not been previously secured to the casing 11, are sealed to the casing by soldering, welding, or the like. The filter is then ready for attachment to or insertion in the lubrication system of an automobile or other machine and is adapted to remain in operative association therewith without attention until so much deleterious matter, grit, dirt and the like has been removed from the oil that the filter becomes clogged and is no longer efficient. The unit is then removed from the lubrication system and may be discarded.

Figures 4 and 5 illustrate a construction wherein the filter heads are not welded to the end members of the casing but are secured thereto by tubular rivets or the like in practically the same manner that the lower head 50 is secured to the casing end member 13 shown in Figure 1. Referring now to Figures 4 and 5, the upper and lower casing end members 12 and 13 are substantially the same as shown in Figure 1. The upper filter head 75, like the filter heads 50 described above, is provided with a circumferential flange 76 and attaching ears 77 adapted to be bent or clinched over the end coils of the helix of the filter unit. However, unlike the filter heads 50, the heads 75 are provided with central spacing means, rather than a plurality of bosses or extensions, as illustrated in Figures 2 and 3 for the heads 50. The filter heads 75 are provided with central recessed portions 80 which are apertured and which include a supplemental recessed portion 82. The recesses 80 are provided with central apertures to receive the tubular members by which the filter heads are attached to the casing ends.

The lower filter head 75 includes a tubular member or rivet 85 having a flange 86 and a washer 87 disposed on the inside of the filter bag 43, the latter being maintained against the washer 87 by means of a clinching washer 88 similar to or identical with the clinching washer 64 shown in Figure 1. As in the latter figure, the end of the tubular member is extended into the outlet nipple 30 and is firmly riveted therein, as indicated at 66. This disposes the recess 80 against the plate 35 of the lower casing end member 13 so that the tubular member or rivet 85 securely holds the filter head 75 in firm rigid relationship with the casing end member 13.

The upper filter head 75 is secured to the upper casing end member 12 in a similar manner. A tubular member or rivet 90, having a head 91 and a washer 92, is inserted in the opening in the recessed portion 80 and into the inlet nipple 21, where it is firmly riveted therein, as indicated by the reference numeral 66. The recessed portion 80 for the upper filter head is provided with a number of apertures 95, see Figure 5, and a flat closure plate 97 is disposed over the inner end of the tubular member 90 and in the supplemental recessed portion 82 and is firmly welded or soldered therein. The proportions of the recessed portions 80 and 82 are such that the closure plate 87 is spaced from the inner end of the tubular member 90 so as to allow the lubricant to flow in through the tubular member 90 and radially outwardly or laterally through the openings 95 across the upper surface of the upper filter head 75 and into the space between the casing 11 and the outside of the filter bag 43. The movement of the lubricating oil over the upper surface of the filter head 75 is effective in reducing the temperature of the oil at this point.

As in the case of Figure 1, the upper and lower filter heads 75 are practically identical in construction, although it is not necessary that, for example, the lower filter head 75 be provided with either the supplemental recessed portion 82 or the central recessed portion 80.

The form of filter shown in Figures 4 and 5 is assembled in the same manner as described above in connection with Figures 1 to 3. The other forms of filter, described below, are likewise assembled in the same way.

It is also to be noted that, if desired, and as suggested in my copending application referred to above, the filter heads may be provided with openings providing for a slightly increased filtering capacity of the unit.

Figures 6 to 11, inclusive, illustrate a third form of the invention that differs from the two forms described above in that both the inlet and the outlet nipples are carried by one of the casing ends. In some lubrication systems, this type of construction greatly facilitates the insertion and removal of the filter.

Referring now more particularly to Figures 6, 7 and 8, one of the casing end members, preferably the upper end member, indicated by the reference numeral 100, is provided with a raised or recessed portion 101 having two openings 103 and 104. The portion 101 accommodates a casting 105 which is formed with an inlet nipple 106 and an outlet nipple 107 suitably threaded or provided with other means permitting attachment to the lubrication system of a machine, such as an automobile or the like. The casting 105 includes a lower face 109 which is disposed substantially flush with the under surface of the main portion of the casing end member 100. The casting 105 is also provided with a groove 111 which communicates with the opening 112 of the inlet nipple 106. The recessed portion 101 of the casing end includes a supplemental recessed portion 113 which forms a continuation of the groove 111 of the casting 105.

The filter element is indicated in Figure 7 by the reference numeral 43a and includes a filter bag and a supporting spring helix similar to the filter unit shown in Figure 1. The end coils of the supporting helix are embraced by filter heads or plate members 116 and 117, and each of these members is provided with ears 120 which are adapted to be clinched over the end coils of the helix and the ends of the filter bag. The upper head member 116 may be a circular plate formed with a circumferential flange or the equivalent, or, as shown in Figure 8, this member may be made in the form of a strap having the ears 120 formed at the end thereof. The upper head member 116 is provided with an opening 121 which is adapted to register with an opening 122 formed in the outlet nipple 107. A tubular rivet is adapted to be inserted through an opening in the filter bag and to be received within the opening 122 and be riveted therein in the manner described above in connection with Figure 1. Oil on the interior of the filter bag may then flow out through the tubular rivet and through the outlet nipple 107 as in the previous modifications.

One end or one portion of the filter head 116 is adapted to overlie the groove 111, as best shown in Figure 11. This portion of the filter head also overlies the supplemental recessed portion 113, as best shown in Figure 10. The purpose of this arrangement is to direct the incoming oil from the inlet nipple 106 along this portion of the filter head and into the space between the inside of the can 11 and the outside of the filter bag. This prevents the oil from being directed onto the bag itself. The upper filter head 116 is adapted to be welded or otherwise firmly secured in position on the under surface of the casing end member 100. Likewise, the lower filter head 117 is adapted to be welded or soldered onto the associated casing end member.

Figures 13 to 16, inclusive, illustrate another modified form of the present invention, a form in which the necessity for either soldering or welding the filter heads to the casing end members is obviated. In this form, the casing end member and the inlet nipple is of substantially the same construction as shown in Figures 1 and 4 and described above. However, the central plate which holds the hexagonal head 19 of the nipple 21 in place is of slightly different form and is represented in Figure 13 by the reference numeral 25a. The plate 25a is provided with oppositely disposed tongues 130 and 131 which are adapted to be inserted in openings in the filter head or plate 133. For this purpose the latter member is provided with a pair of recessed portions 134, each of which is provided with a slit 135 to receive the tongues 130 and 131. As best shown in Figure 13, the recessed portions 134 also serve to space the filter head 133 from the casing end member 12. The lower casing end member is of substantially the same construction and is provided with a central plate similar to plate 25a having tongues similar to the tongues shown in Figure 13.

In making up the end members the nipples are first inserted and then the plates 25a are soldered or welded in place. The tongues 130 and 131, which are disposed as shown in dotted lines in Figure 13, are then inserted through the openings or slits 135 in the filter head 133. The ends of the tongues 130 and 131 are then bent over to firmly clinch the filter head and to secure it to the associated casing end member. From Figure 13 it will be observed that the recessed portion 134, not only serves as spacing means, but also as means to receive the bent ends of the tongues 130 and 131, leaving the under surface of the filter head substantially flat so that there will be no danger of the end of the filter bag being punctured or otherwise injured.

The lubricant enters the filter through the inlet nipple 21, and flows underneath the plate 25a and beneath the inner surface of the casing end member 12 and the filter head 133 through the space 137 and in between the casing 11 and the outside of the filter bag. For purposes of illustration, the filter bag has been omitted from Figure 13.

While I have indicated above that the filter heads 133 are similar in form to the filter heads shown in Figure 1, it is to be understood that the heads 133 may be in the form of strap members similar to those shown in Figures 7 to 11.

It is also to be understood that while I have shown and described above the preferred constructions in which the principles of the present invention have been embodied, widely different means may be employed in the practice of the broader aspects of my invention.

What I claim, therefore, and desire to secure by Letters Patent is:

1. A filter comprising a casing having end members, a filter element including a filter bag and heads disposed exteriorly of the bag and connected therewith, and means providing for the attachment of said heads directly to said end members.

2. A filter comprising a casing having end members, a filter element including a filter bag, a spring helix supporting said filter bag and end plates disposed exteriorly of said bag and connected therewith and with the end coils of said helix, and means permanently connecting said end plates to said end members.

3. A filter comprising a casing having end members, a filter element including a filter bag and a spring helix supporting said bag, end plates connected with said end members, and means carried by said plates and embracing the end coils of said helix in clamping relation to fixedly connect said plates therewith with the ends of the filter bag therebetween.

4. A filter comprising a casing having end members, a filter element including a filter bag, a spring helix supporting said filter bag and heads disposed exteriorly of the bag and connected therewith, said heads being permanently connected with said end members before they are attached to the filter bag, and inlet means cooperating with one of said heads and carried by the end member with which said one head is connected.

5. A filter comprising a casing having end members, a filter element including a filter bag and heads disposed exteriorly of the bag and connected therewith, said heads being welded to said end members.

6. A filter comprising a casing having end members, a filter element including a filter bag and heads disposed exteriorly of the bag and connected therewith, a nipple carried by one of said end members and having an internal shoulder, and a tubular member passing through one end of the filter bag and the associated head and riveted over the internal shoulder of said nipple to permanently fasten the head and end member together and to provide communication between the interior of said bag and the exterior of the casing.

7. A filter comprising a casing having end members, a filter element including a filter bag and heads disposed exteriorly of the bag, inlet and outlet nipples secured respectively, to said end members, a tubular member passing through one end of the filter bag and the associated head and connected with the nipple carried by the adjacent end member to provide communication between the interior of said bag and the exterior of the casing, said tubular member serving to connect the associated head with said one end member, a second tubular member carried by the other end member and opening into communication with the space between the filter bag and the casing, and means including said second tubular member for securing the other end member with the head associated therewith.

8. A filter comprising a casing having end members, a filter element including a filter bag and heads disposed exteriorly of the bag, each of said heads including a central recessed section, inlet and outlet nipples secured, respectively, to said end members, a tubular member passing through one end of the filter bag and the depressed section of the associated head and connected with the nipple connected with the associated end member to provide communication between the interior of said bag and the exterior of the casing, said tubular member serving to connect the associated head with said one end member, a second tubular member carried by the other end member and passing through the central recessed section of the other head, a plate secured over said last named section, there being an opening formed in the marginal portion of said last named section by which said second tubular member communicates with the space between the filter bag and the casing, and means including said second tubular member for securing the other end member with the head associated therewith.

9. A filter comprising a casing having end members, a filter element including a filter bag and heads disposed exteriorly of the bag and connected therewith, inlet and outlet nipples secured, respectively, to said end members, a tubular member passing through one end of the filter bag and the associated head and through at least a portion of the nipple connected with the associated end member to provide communication between the interior of said bag and the exterior of the casing and to connect the associated head with said one end member, and means securing the other head with the other end member.

10. A filter comprising a casing, a member closing one end of said casing, inlet and outlet nipples carried by said end members, a filter element including a filter bag disposed within said casing, a head member carrier by and secured to said end member at points spaced from said nipples and disposed adjacent the opening in one of said nipples and engaging the other nipple and having an opening registering with the opening in said other nipple, and a tubular member passing through one end of the filter bag and the associated head and connected with said other nipple to provide communication between the interior of said bag and the exterior of the casing, said tubular member serving to also connect the associated head with said one end member.

11. A filter comprising a casing having end members, a filter element including a spring helix and a filter bag carried thereby, strap members secured to said end members, and ears carried by the ends of said strap and embracing the ends of the filter bag and engaging over the end coils of said helix.

12. A filter comprising a casing having end members, a filter element including a filter bag and heads disposed exteriorly of the bag, means rigidly securing said heads to said end members, spacing bosses carried by said heads in spaced relation with respect to said securing means and adapted to bear against said end members when the heads are secured thereto, an inlet nipple carried by one of said end members, the inner end of said nipple being spaced from the adjacent filter head by virtue of said bosses to provide for a diversion of the fluid flow, an outlet nipple carried by the other of said end members, and a tubular member passing through one end of the filter bag and the associated head and connected with the outlet nipple, said tubular member serving to connect the associated head with said one end member.

13. A filter comprising a filter unit including a spring helix and a filter bag surrounding the helix, and sheet metal filter heads including a body portion having ears clinched over both the bag and the end coils of the helix, sheet metal end members spot welded to said filter heads, and a sheet metal casing carrying said end members and surrounding said filter unit.

14. A filter comprising a filter unit including a spring helix and a filter bag surrounding the helix, and sheet metal filter heads including a body portion having ears clinched over both the bag and the end coils of the helix, sheet metal end members spot welded to said filter heads, and a sheet metal casing carrying said end members and surrounding said filter unit, each of said filter heads being identical and each having bosses extending to points spaced from the general plane of said heads and serving as portions for receiving the spot welds when the heads are attached to said casing end members.

15. A filter comprising a sheet metal casing having end members each of which is provided with a central raised portion having a central aperture, a nipple disposed in each of said apertures and having a head disposed in said raised portion, an apertured plate secured to the inner side of each of said end members and serving to permanently secure the associated nipple in place, a filter unit disposed within said casing and consisting of a spring helix, a filter bag enclosing the same, a pair of filter heads, one at each end of said helix, each of said filter heads including a main supporting portion having ears clinched over the bag and the end coils of said helix, a tubular member associated with one of said nipples and leading into the interior of said filter bag, and means for permanently securing said filter heads to said casing end members.

16. A filter comprising a casing having end members of identical construction, each including a central section having a threaded nipple secured thereto, each nipple including an internal shoulder, a filter unit including a filter bag provided at each end with a metal head permanently secured to the adjacent end member, each head being spaced a short distance from the inner end of the nipple of the associated end member, and a tubular rivet having a head disposed on the inside of the filter bag and an end disposed in and riveted against the shouldered portion of the adjacent nipple.

17. A filter unit including a spring helix and a filter bag surrounding the helix, and sheet metal filter heads including a body portion disposed exteriorly of said filter bag and having ears clinched over both the bag and the end coils of the helix.

18. A filter comprising a casing having end members, a filter element including an expansible spring helix and an enclosing bag capable of extension to a length materially greater than the length of said casing, filter head members fixedly secured to said end members exteriorly of the filter bag, and means carried by each of said head members for gripping the end coils of said helix and the included portions of the filter bag so as to hold the filter element in position within the casing.

19. In a filter, a casing unit comprising an outer shell, and a filter head welded to each end of the shell.

20. In a filter, a casing unit comprising an outer generally cylindrical shell, end members for the ends of said shell, a filter head welded to the end member, and means carried by each filter head adapted to receive a filter element.

21. In a filter, an article of manufacture comprising a casing end member, a filter head welded thereto, and means carried by said filter head and adapted to receive a filter element.

CLARENCE H. DOOLEY.